United States Patent [19]

Saito

[11] Patent Number: 4,871,056

[45] Date of Patent: Oct. 3, 1989

[54] BALUSTRADE FOR PASSENGER CONVEYER

[75] Inventor: Chuichi Saito, Katsuta, Japan

[73] Assignee: Hitachi, Ltd., Tokyo, Japan

[21] Appl. No.: 199,268

[22] Filed: May 26, 1988

[30] Foreign Application Priority Data

Jun. 3, 1987 [JP] Japan ................................ 62-139416

[51] Int. Cl.[4] ............................................. B65G 15/00

[52] U.S. Cl. ..................................................... 198/335

[58] Field of Search ......................... 198/335, 337, 329

[56] References Cited

U.S. PATENT DOCUMENTS

| | | | |
|---|---|---|---|
| 3,926,296 | 12/1975 | Woodling et al. | 198/335 X |
| 3,981,118 | 9/1976 | Johnson et al. | 198/335 X |
| 4,449,623 | 5/1984 | Saito et al. | 198/335 |

FOREIGN PATENT DOCUMENTS

| | | | |
|---|---|---|---|
| 625945 | 12/1962 | Belgium | 198/335 |
| 91283 | 8/1978 | Japan | 198/335 |
| 140383 | 10/1979 | Japan | 198/335 |
| 140386 | 10/1979 | Japan | 198/335 |
| 188773 | 5/1981 | Japan | 198/335 |
| 346337 | 6/1960 | Switzerland | 198/335 |
| 2104471 | 3/1983 | United Kingdom | 198/335 |
| 2140375 | 11/1984 | United Kingdom | 198/335 |

*Primary Examiner*—Robert J. Spar
*Assistant Examiner*—James R. Biwell
*Attorney, Agent, or Firm*—Antonelli, Terry & Wands

[57] ABSTRACT

In a balustrade for a passenger conveyor, a main deck is fixedly mounted to an upper end of a vertically upright balustrade panel, and a guide frame is arranged on the main deck for slidingly guiding a handrail. In order to easily carry out an operation of fixedly mounting the main deck to the upper end of the balustrade panel, at least one fixing instrument is provided which has an inverted U-shaped fitting groove on one side and a fixing section on the other side, and the main deck is fixedly mounted to the upper end of the balustrade panel through the fixing instrument.

4 Claims, 4 Drawing Sheets

BALUSTRADE FOR PASSENGER CONVEYER

BACKGROUND OF THE INVENTION

1. Field of the Invention

The present invention relates to balustrades for passenger conveyers such as escalators, electric-powered roads and the like and, more particularly, to a balustrade for a passenger conveyer which comprises a fixing instrument arranged within a main deck for fixedly mounting the main deck to a balustrade panel.

2. Description of the Prior Art

In a general or usual balustrade for a passenger conveyer, as disclosed in, for example, Japanese Utility Model Application Laid-Open No. 57-188773, a plurality of fixing instruments each composed of a pair of fixing members is arranged within a main deck supporting a handrail, with each pair of fixing members cooperating with each other to clamp therebetween an upper end of an upright balustrade panel to thereby fixedly mount the main deck to the balustrade panel.

It will be understood from the foregoing that in order to fixedly mount the main deck to the balustrade panel, it is necessary to clamp the balustrade panel by each pair of fixing members. For this reason, a worker fastens each pair of fixing members to each other by means of a bolt and a nut at a job site where the passenger conveyer is installed. Fastening portions by means of the respective pairs of bolts and nuts are located outwardly of the balustrade. The reason for this is to prevent projections interfering with passengers from being formed inwardly of the balustrade. Accordingly, it is necessary for the worker to carry out the fastening operation of the bolts and nuts with his body leaning outwardly of the passenger conveyer. Thus, that fixing operation of the main deck to the balustrade panel is troublesome.

SUMMARY OF THE INVENTION

It is an object of the invention to provide a balustrade for a passenger conveyer, in which it is possible to easily carry out fixing operation of a main deck to a balustrade panel.

Another object of the invention to provide a balustrade for a passenger conveyer, in which if an illuminating lamp is arranged within a main deck, it is possible to restrain a rise in temperature within the main deck due to heat generation of the lamp.

Yet another object of the invention to provide a balustrade for a passenger conveyer, in which if an illuminating lamp is arranged within a main deck, it is possible to easily lay electric wires for the lamp.

For the above purposes, according to the invention, there is provided a balustrade for a passenger conveyer comprising a balustrade panel, a main deck, and a plurality of fixing instruments, with each of the fixing instruments having a fixing section for the main deck and a groove into which an end of the balustrade panel can be fitted, wherein the groove in each of the fixing instruments is fitted about the end of the balustrade panel to fixedly mount the fixing instrument to the end of the balustrade panel, wherein the fixing instruments are arranged in a spaced relationship to each other along the balustrade panel, and wherein the main deck is mounted to the fixing sections of the respective fixing instruments.

DESCRIPTION OF THE PREFERRED EMBODIMENTS

Figure 1:
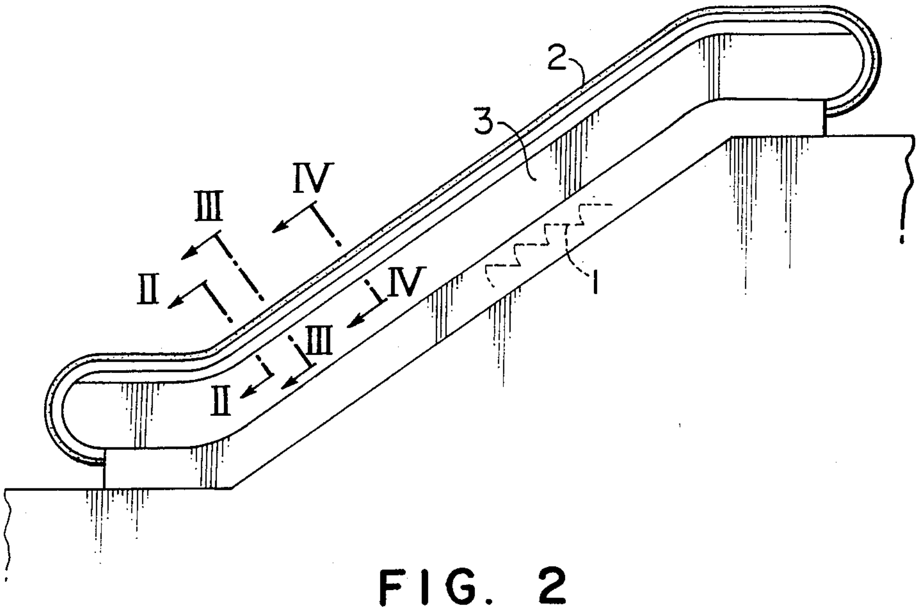
FIG. 1 is a side elevational view of an embodiment of a balustrade for a passenger conveyer according to the invention.
Figure 2:
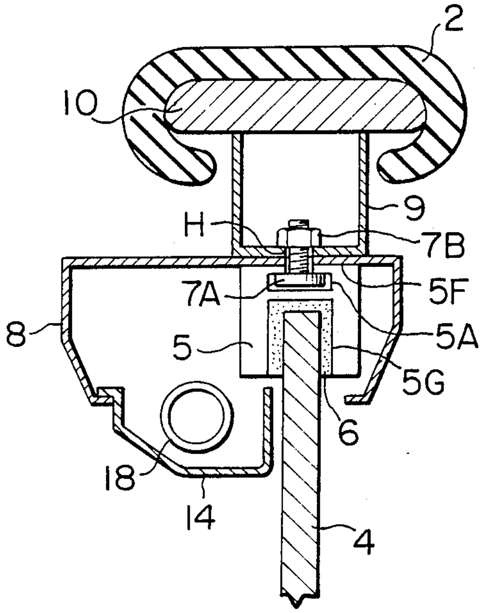
FIG. 2 is an enlarged cross-sectional view taken along line II—II in FIG. 1.

An embodiment of the invention will be described below with reference to FIGS. 1 through 5 which illustrate a balustrade for an escalator. The escalator comprises a plurality of steps 1 connected to each other to form a driven endless step structure. A pair of handrails 2 are respectively arranged on opposite sides of the endless step structure and extend along the traveling direction thereof. The handrails 2 are driven in synchronism with the endless step structure. A pair of balustrades 3 are provided for guiding the respective handrails 2. Each of the balustrades 3 includes a balustrade panel 4 formed of transparent reinforced glass. The balustrade panel 4 is arranged vertically and has a lower portion thereof supported by a fixed member. A plurality of fixing instruments 5 are fixedly mounted to an upper end of the balustrade panel 4. A main deck 8 and a guide frame 9 are mounted to the fixing instruments 5. A guide 10 is fixedly secured to the guide frame 9 and is in sliding contact with an inner peripheral surface of the handrail 2.

Each of the fixing instruments 5 has an appearance of an inverted U-shape provide therein with an inverted U-shaped fitting groove 5G opening downwardly. The inverted U-shaped fixing instrument 5 has a bottom whose outer surface portion is formed into a planar section serving as a fixing section 5F for the main deck 8. The fixing section 5F is formed therein with an inverted T-shaped engaging groove 5A whose lower end portion is enlarged in width. The fitting groove 5G in the fixing instrument 5 is fitted about the upper end of the balustrade panel 4 in such a manner that the fixing instrument 5 straddles the upper end of the balustrade panel 4. The fixing instrument 5 has a length of 30 to 100 mm. The plurality of fixing instruments 5 are spaced from each other at intervals L of 300 to 500 mm longitudinally of the balustrade panel 4. Each fixing instrument 5 is fixedly bonded to the upper end of the balustrade panel 4 by an adhesive 6. Each of a plurality of bolts 7A has a head which is inserted into the engaging groove 5A in a corresponding one of the fixing instruments 5 fixedly mounted to the upper end of the balustrade panel 4. The head of the bolt 7A is square in shape as viewed in plan. When a nut 7B is threadedly engaged with the bolt 7A and is tightened in a manner described herein below, the square head of the bolt 7A interferes with the engaging groove 5A to serve as a detent.

The main deck 8 is made of a sheet of stainless-steel, for example, which is so bent as to form an opening facing downwardly. The main deck 8 is arranged in a back to back relationship to the guide frame 9 formed into a U-shaped cross-section. The main deck 8 and the guide frame 9 may be joined beforehand to each other by fixing means such as welding, bonding, bolt fastening and the like, or may be maintained separated from each other. In either case, however, a plurality of through bores H are provided in the main deck 8 and the guide frame 9 at respective locations respectively corresponding to the bolts 7A. The bolts 7A respectively pass through the through bores H such that the forward ends of the respective bolts 7A project into the guide frame 9. The nuts 7B are respectively threadedly engaged with the forward ends of the respective bolts 7A and are tightened whereby the main deck 8 and the guide frame 9 are fixedly mounted to the fixing instruments 5.

The main deck 8 has incorporated therein first brackets 11A and second brackets 11B. Each of the first brackets 11A and a corresponding one of the second brackets 11B are fixedly mounted to the main deck 8 by a screw 12A and a nut 12B. The screw 12A extends through both the main deck 8 and the guide frame 9 at a location which does not overlap the through bore H for the bolt 7A. Each of a pair of sockets 13 for a rod-like fluorescent lamp 18 is mounted to a forward end of a corresponding one of the first brackets 11A. Each of the second brackets 11B has a forward end provided with a threaded bore S. Screws 14B are respectively threadedly engaged with the threaded bores S in the forward ends of the respective second brackets 11B for mounting a lamp cover 14 to the second brackets 11B. Lead wires 15 extending from each of the sockets 13 are guided into the guide frame 9 through a wiring bore 16 which is formed through the main deck 8 and the guide frame 9 at a location which does not overlap the fixing instrument 5. The lead wires 15 as well as other electric wires 17 are laid within the guide frame 9. The lamp cover 14 has a side wall portion which is confronted with the balustrade panel 4 with a gap left therebetween.

An operational process of assembling the balustrade for the escalator constructed as above will next be described.

Figure 5:
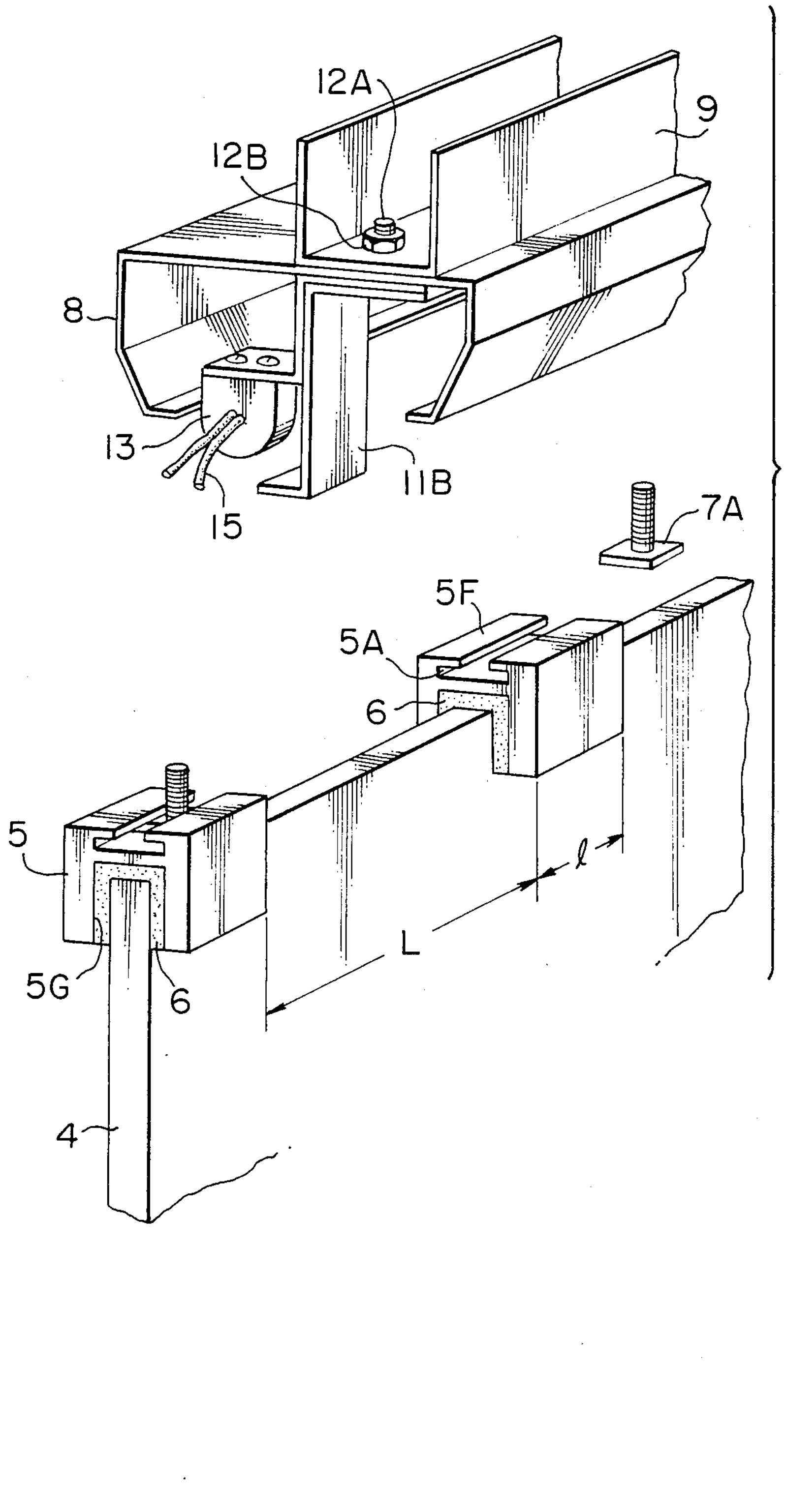
FIG. 5 is an exploded perspective view showing the operation of fixedly mounting a main deck to a balustrade panel.

As shown in FIG. 5, the fixing instruments 5 are beforehand fixedly mounted, at a factory, to the upper end of the balustrade panel 4 at intervals L. The balustrade panel 4 having fixedly mounted thereto the fixing instruments 5 is carried to a job site of installation of the escalator. In addition, the main deck 8 and the guide frame 9 are also beforehand united to each other into an assembly by spot welding at the factory. Further, the first and second brackets 11A and 11B are also beforehand attached to the main deck 8 and the guide frame 9.

At the site of installation, the balustrade panel 4 is vertically supported by an escalator body frame (not shown) and, subsequently, the heads of the respective bolts 7A are first respectively inserted into the engaging grooves 5A in the respective fixing instruments 5 to erect the bolts 7A. The through bores H beforehand provided through both the main deck 8 and the guide frame 9 are respectively aligned with the bolts 7A, and the assembly of the main deck 8 and the guide frame 9 is mounted on the fixing instruments 5 such that the forward ends of the respective bolts 7A respectively extend through the through bores H into the guide frame 9. The nuts 7B respectively are threadedly engaged with the forward ends of the respective bolts 7A projecting into the guide frame 9 and are tightened to fasten the assembly of the main deck 8 and the guide frame 9 to the fixing instruments 5. Thus, the fixing instruments 5 and the assemblies each composed of the pair of brackets 11A and 11B are arranged alternately along the upper end of the balustrade panel 4 and in a spaced relationship to each other.

Figure 4:
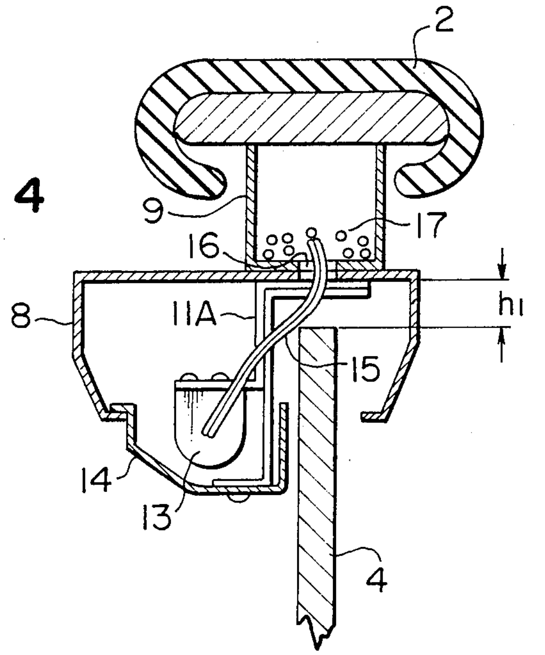
FIG. 4 is an enlarged cross-sectional view taken along line IV—IV in FIG. 1.

Subsequently, the lead wires 15 from each of the sockets 13 retained on a corresponding one of the first brackets 11A are caused to pass through the wiring bore 16 as shown in FIG. 4, and are drawn into the guide frame 9. The rod-like fluorescent lamp 18 is mounted between the sockets 13. Then, the lamp cover 14 is mounted to the second brackets 11B by the screws 14B, and the guide 10 is fixedly mounted to the guide frame 9 to permit the handrail 2 to be guided by the guide 10.

According to the invention, the engaging groove 5A in each of the fixing instruments 5 enables a corresponding one of the bolts 7A to be mounted such that the bolts 7A extend vertically upwardly from the fixing section 5F of the fixing instrument 5. The upstanding bolts 7A can be utilized to fixedly mount the main deck 8 to the fixing instrument 5. Thus, the worker can carry out the assembling operation in an upright posture. As a result, it is possible to easily carry out the assembling operation, even if the wall of a building is located adjacent the balustrade of the escalator. Additionally, the operations such as wiring of the lead wires 15, mounting of the rod-like fluorescent lamp 18 and attachment of the lamp cover 14 are required to be carried out outwardly of the balustrade of the escalator and, therefore, the operations are inferior in operability. However, such operations are not large-scale ones, unlike attachment of the main deck 8 and the like. Accordingly, it is possible to carry out such operations relatively easily even if the worker leans outwardly of the balustrade. However if the worker hates carrying out any operations with leaning outwardly of the balustrade, wiring of the lead wires 15, mounting of the rod-like fluorescent lamp 18 and attachment of the lamp cover 14 should beforehand be carried out prior to attachment of the main deck 8 to the fixing instruments 5.

Figure 3:
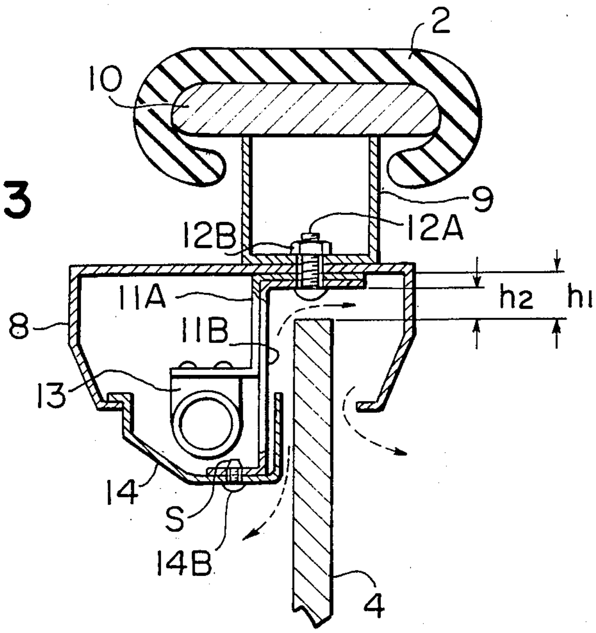
FIG. 3 is an enlarged cross-sectional view taken along line III—III in FIG. 1.

Further, according to the invention, the interior of the guide frame 9 can be utilized to lay the requisite lead wires 15 and electric wires 17. This eliminates the need for provision of an especial wiring trough. That is, the main deck 8 is mounted to the balustrade panel 4 through the fixing instruments 5 which are fixedly mounted to the balustrade panel 4 in spaced relation to each other. Accordingly, a non-contact section $h_1$ shown in FIGS. 3 and 4 is defined between the upper end of the balustrade panel 4 and the main deck 8 and between each pair of adjacent fixing instruments 5. The non-contact section $h_1$ is utilized to provide the wiring bore 18 in the main deck 8 and the guide frame 9. This makes it possible to lay the wires 15 and 17 within the guide frame 9. As a result, no such problems arise such as drooping or sagging of the lead wires 15 and electric wires 17 and the like, and no special wiring trough is required for preventing the lead wires 15 and electric wires 17 from sagging down.

Moreover, according to the invention, recirculation of cooling air makes it possible to prevent a rise in temperature due to heat generation of the rod-like fluorescent lamp 18. Heat is generated by turning-on the rod-like fluorescent lamp 18, and a rise in temperature is remarkable, in particular, at the sections adjacent the sockets 13. As described previously, however, since each of the non-contact sections $h_1$ is utilized to mount a corresponding one of the sockets 13, a non-contact section of the size of $h_2$ still remains at the non-contact section $h_1$, even if the thicknesses of the respective brackets 11A and 11B are taken away from the non-contact section $h_1$. Thus, air can freely communicate with the interior of the main deck 8 through the non-contact section $h_1$ or the non-contact section $h_2$. Moreover, since the lamp cover 14 and the main deck 8 are maintained out of contact with the balustrade panel 4, air can freely flow as indicated by the broken lines in FIG. 3 so that heat can sufficiently be radiated. As a result, such inconveniences as heat damage and the like of the lamp cover 14 due to a rise in temperature within the main deck 8 can be eliminated.

Figure 6:
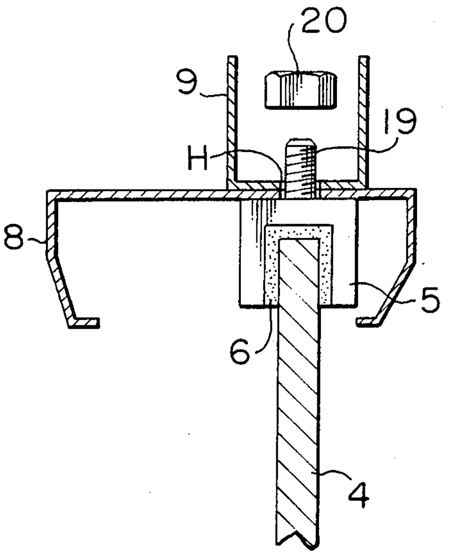
FIG. 6 is a fragmental cross-sectional view of another embodiment of the invention.
Figure 7:
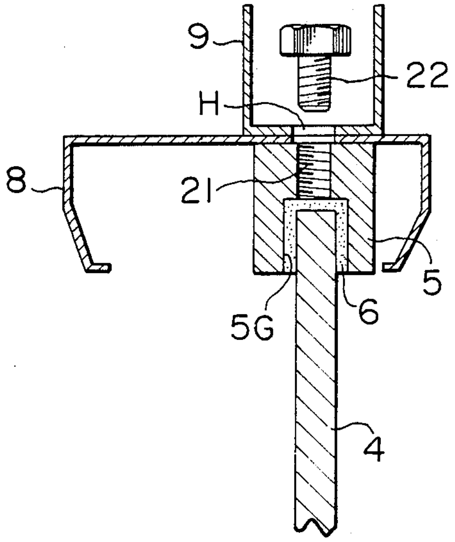
FIG. 7 is a view similar to FIG. 6, but showing still another embodiment of the invention.

The arrangement of the above-described embodiment is such that the engaging grooves 5A are respectively formed in the upper surfaces of the respectively fixing instruments 5, and the main deck 8 and the guide frame 9 are both fastened to the fixing instruments 5 by the nuts 7B and the bolts 7A respectively fitted into the engaging grooves 5A. This manner requires the operation of fitting the bolts 7A into the respective engaging grooves 5A at the job site of installation. In view of such inconvenience, as shown in FIG. 6, the fixing instruments 5 may be used in which a bolt 19 is beforehand implanted in the upper surface of each of the fixing instruments 5 in united relation thereto. In this case, the respectively bolts 19 are caused to pass through the through bores H in the main deck 8 and the guide frame 9 at the site of installation, and nuts 20 are respectively threadedly engaged with the bolts 19 and are tightened. Moreover, as shown in FIG. 7, each of threaded bores 21 may be provided which extends from the upper surface of a corresponding one of the fixing instruments 5 toward the bottom of the inverted U-shaped fitting groove 5G therein. In this case, the respective tightening bolts 22 passing through the through bores H in the main deck 8 and the guide frame 9 are respectively threadedly engaged with the threaded bores 21 and are tightened.

In the above described embodiments each of the fixing instruments 5 is fixedly mounted to the balustrade panel 4 by the adhesive 6, however, it is to be understood, that only the adhesive 6 may be interposed between the fixing instrument 5 and the balustrade panel 4, or a fibrous substrate impregnated with the adhesive 6 may be interposed between the fixing instrument 5 and the ballustrade panel 4.

As described above, in the balustrade for the passenger conveyer in which the main deck supporting the handrail is fixedly mounted to the end of the balustrade panel, the improvement according to the invention makes it possible for the worker to fixedly mount the main deck to the end of the balustrade panel in an upright posture. In addition, if the illuminating lamp is arranged within the main deck, it is possible to prevent a rise in temperature within the main deck due to heat generation of the illuminating lamp. Moreover, the wires for the illuminating lamp can easily be laid without provision of a trough exclusive for the wires.

What is claimed is:

1. A balustrade for a passenger conveyer, the balustrade comprising:

a vertically upright balustrade panel;

a main deck fixedly mounted to an upper end of said vertically upright balustrade panel;

a guide rail;

a guide frame arranged on said main deck for slidingly guiding said handrail; and a plurality of fixing instruments each having an inverted U-shaped fitting groove on one side and a fixing section on the other side, said fixing instruments being spaced from each other at intervals longer than a length of each of said fixing instruments, said fitting groove in said fixing instrument being fitted about the upper end of said balustrade panel to mount said fixing instruments to the upper end of said balustrade panel, said main deck being attached to said fixing section of said fixing instruments wherein said main deck is fixed onto said fixing instruments with spaces left between said main deck and an upper end of said balustrade panel in the intervals between the said fixing instruments.

2. A balustrade for a passenger conveyer, the balustrade comprising:

a vertically upright balustrade panel;

a main deck fixedly mounted to an upper end of said vertically upright balustrade panel;

a handrail;

a guide frame arranged on said main deck for slidingly guiding said handrail;

a plurality of fixing instruments each having an inverted U-shaped fitting groove on one side and a fixing section on the other side, said fitting grooves in the respective fixing instruments being fitted about the upper end of said balustrade panel to fixedly mount said fixing instruments to the upper end of said balustrade panel in a spaced relationship to each other longitudinally of the upper end of said balustrade panel, said main deck being attached to the fixing sections of the respective fixing instruments;

a plurality of illuminating lamps; and a plurality of sockets for respectively holding said illuminating lamps, a plurality of pairs of sockets, each of said pair of sockets being supported by a corresponding one of sections of said main deck which extend respectively between the adjacent fixing instruments wherein said main deck is fixed onto said fixing instruments with spaces left between said main deck and an upper end of said balustrade panel in the intervals between the said fixing instruments.

3. A balustrade for a passenger conveyer, the balustrade comprising:

a vertically upright balustrade panel;

a main deck fixedly mounted to an upper end of said vertically upright balustrade panel;

a handrail;

a guide frame arranged on said main deck for slidingly guiding said handrail;

a plurality of fixing instruments each having an inverted U-shaped fitting groove on one side and a fixing section on the other side, said fitting grooves in the respective fixing instruments being fitted about the upper end of said balustrade panel to fixedly mount said fixing instruments to the upper end of said balustrade panel in a spaced relationship to each other longitudinally of the upper end of said balustrade panel, said main deck being attached to the fixing sections of the respective fixing instruments;

a plurality of lamp covers;

a plurality of illuminating lamps;

a plurality of sockets for respectively holding said illuminating lamps;

a plurality of brackets for respectively supporting said lamp covers, each of said brackets being supported by a corresponding one of sections of said main deck which extend respectively between the adjacent fixing instruments;

a pair of wiring bores extending to an interior of said guide frame, each of said wiring bores being formed in a corresponding one of the sections of said main deck extending respectively between the adjacent fixing instruments; and lead wires extending from each of said sockets, said lead wires from each socket being caused to pass through a corresponding one of said wiring bores, said lead wires being laid within said guide frame wherein said main deck is fixed onto said fixing instruments with spaces left between said main deck and an upper end of said balustrade panel in the intervals between the said fixing instruments.

4. A balustrade for a passenger conveyer according to claim 3, wherein said fitting groove in each of said fixing instruments and the upper end of said balustrade panel are fixed to each other by an adhesive.

* * * * *